United States Patent
Aharony

(10) Patent No.: US 9,231,832 B2
(45) Date of Patent: Jan. 5, 2016

(54) AUTOMATICALLY-RECONFIGURABLE TROPOSPHERIC SCATTER COMMUNICATION LINK

(71) Applicant: Ahikam Aharony, Ottawa (CA)

(72) Inventor: Ahikam Aharony, Ottawa (CA)

(73) Assignee: Ahikam Aharony, Ottawa, Ontario (CA)

( * ) Notice: Subject to any disclaimer, the term of this patent is extended or adjusted under 35 U.S.C. 154(b) by 195 days.

(21) Appl. No.: 14/142,853

(22) Filed: Dec. 29, 2013

(65) Prior Publication Data

US 2015/0189651 A1    Jul. 2, 2015

(51) Int. Cl.
*H04W 4/00* (2009.01)
*H04L 12/24* (2006.01)
*H04B 7/12* (2006.01)

(52) U.S. Cl.
CPC *H04L 41/12* (2013.01); *H04B 7/12* (2013.01); *H04L 41/0813* (2013.01); *H04L 41/082* (2013.01); *H04L 41/0816* (2013.01)

(58) Field of Classification Search
CPC ........... H04L 41/0813; H04L 41/0816; H04L 41/082; H04L 41/12; H04W 72/04
USPC ......................................... 370/254, 310, 315
See application file for complete search history.

(56) References Cited

U.S. PATENT DOCUMENTS

| | | | |
|---|---|---|---|
| 4,170,011 A | 10/1979 | Birkemeier et al. | |
| 4,347,514 A * | 8/1982 | Birkemeier | H01Q 1/1257 342/367 |
| 6,393,386 B1 * | 5/2002 | Zager | H04L 41/0233 370/254 |
| 7,711,030 B2 | 5/2010 | Perlman | |
| 8,428,605 B2 | 4/2013 | Pedersen et al. | |
| 2007/0082674 A1 * | 4/2007 | Pedersen | H04B 7/026 455/450 |
| 2008/0104141 A1 * | 5/2008 | McMahon | G06F 17/2288 |
| 2008/0181169 A1 * | 7/2008 | Lauer | H04B 7/18506 370/316 |
| 2008/0305762 A1 * | 12/2008 | Malosh | H04B 7/18506 455/404.1 |
| 2013/0159548 A1 * | 6/2013 | Vasseur | H04L 45/125 709/239 |
| 2015/0179028 A1 * | 6/2015 | Bairaktaris | G08B 5/36 340/815.4 |

FOREIGN PATENT DOCUMENTS

EP    0687076 B1    8/2006
WO    2012114154 A1    8/2012

OTHER PUBLICATIONS

Recommendation ITU-R P.617-2, "Propagation Prediction Techniques and Data Required for the Design of Trans-Horizon Radio-Relay Systems", 12 pages, Feb. 2012.
Barue, G., "Microwave Engineering: Land & Space Radiocommunications", Publication by John Wiley & Sons, p. 378, year 2008.

* cited by examiner

*Primary Examiner* — Farah Faroul
(74) *Attorney, Agent, or Firm* — D. Kligler I.P. Services Ltd.

(57) ABSTRACT

A communication system includes multiple communication nodes and a processor. The communication nodes are configured to communicate over a tropospheric scattering channel. The processor is configured to communicate with the communication nodes over a secondary communication network, different from the tropospheric scattering channel, so as to control communication of the communication nodes over the tropospheric scattering channel.

14 Claims, 2 Drawing Sheets

AUTOMATICALLY-RECONFIGURABLE TROPOSPHERIC SCATTER COMMUNICATION LINK

FIELD OF THE INVENTION

The present invention relates generally to radio communication, and particularly to methods and systems for tropospheric scatter communication.

BACKGROUND OF THE INVENTION

Tropospheric scatter is a communication technique in which a transmitter transmits radio signals toward the stratosphere, and a receiver receives a portion of the signal that is scattered in the stratosphere. Tropospheric scatter (often referred to as "troposcatter") enables long-distance, non line-of-sight communication, without the need for manmade repeaters.

Various troposcatter communication techniques are known in the art. For example, U.S. Pat. No. 7,711,030, whose disclosure is incorporated herein by reference, describes techniques for spatial-multiplexed tropospheric scatter communications. A disclosed method comprises transmitting a training signal from each antenna of a base station to each of a plurality of client devices utilizing tropospheric scatter. Each of the client devices analyzes each training signal to generate channel characterization data, and transmits the channel characterization data back to the base station utilizing tropospheric scatter. The channel characterization data is stored for each of the plurality of client devices. Data to be transmitted to each of the client devices is received, and the data is precoded using the channel characterization data associated with each respective client device to generate precoded data signals for each antenna of the base station. The precoded data signals are transmitted through each antenna of the base station to each respective client device.

Accurate antenna alignment is an important feature in troposcatter systems. Various troposcatter antenna alignment schemes are known in the art. For example, U.S. Pat. No. 4,347,514, whose disclosure is incorporated herein by reference, describes an antenna alignment scheme in a troposcatter system. Antenna alignment is accomplished by nutating the antenna receiver beam with a sinusoidal nutation signal to induce envelope modulation on the received signal, cross-correlating the envelope of the received signal with the nutating signal, and aligning the average angle of the antenna receiver beam into the position where the crosscorrelation goes to zero.

As another example, U.S. Pat. No. 4,170,011, whose disclosure is incorporated herein by reference, describes an azimuthal alignment method for troposcatter system antennas, which is achieved by centering on the great circle, the combined pattern of intercepting beams from two troposcatter antennas. The combined antenna pattern is determined to be centered on and symmetric about the great circle when the Doppler spectrum on a received signal is symmetric about zero Doppler shift.

SUMMARY OF THE INVENTION

An embodiment of the present invention that is described herein provides a communication system including multiple communication nodes and a processor. The communication nodes are configured to communicate over a tropospheric scattering channel. The processor is configured to communicate with the communication nodes over a secondary communication network, different from the tropospheric scattering channel, so as to control communication of the communication nodes over the tropospheric scattering channel.

In some embodiments, the communication nodes are configured to relay data between first and second endpoints by communicating in a cascade over the tropospheric channel, and the processor is configured to adaptively add or remove at least one of the communication nodes to and from the cascade. In an embodiment, the processor is configured to identify a minimal subset of the communication nodes that are needed for connecting the first and second endpoints, and to configure the cascade so as to include only the minimal subset of the communication nodes.

In an example embodiment, the processor is configured to alternate between a first configuration in which the data is relayed with a first end-to-end latency and a first end-to-end throughput, and a second configuration in which the data is relayed with a second end-to-end latency, smaller than the first end-to-end latency, and a second end-to-end throughput that is smaller than the first end-to-end throughput.

In another embodiment, the processor is configured to adaptively set respective operating frequencies of the communication nodes on the tropospheric scatter channel. In yet another embodiment, the processor is configured to obtain from the communication nodes, by communication over the secondary communication network, measurements relating to the tropospheric scattering channel, and to control the communication over the tropospheric scattering channel based on the measurements.

In still another embodiment, the processor is configured to instruct a pair of the communication nodes, over the secondary communication network, to perform an antenna alignment process. In a disclosed embodiment, a pair of the communication nodes is configured to perform a mutually-coordinated antenna alignment process by communicating over the secondary communication network. In an embodiment, the processor is configured to select a time that is permitted for reconfiguring the communication nodes, and to coordinate reconfiguration of the communication nodes at the selected time using the secondary communication network.

There is additionally provided, in accordance with an embodiment of the present invention, a method for communication including communicating among multiple communication nodes over a tropospheric scattering channel. Communication is carried out with the communication nodes over a secondary communication network, different from the tropospheric scattering channel, so as to control communication of the communication nodes over the tropospheric scattering channel.

There is also provided, in accordance with an embodiment of the present invention, a method including communicating between first and second communication nodes via respective first and second antennas over a tropospheric scattering channel. The first and second antennas are adjusted in an antenna alignment process that is mutually coordinated between the first and second communication nodes, by communicating between the first and second communication nodes over a secondary communication network that is different from the tropospheric scattering channel.

In some embodiments, adjusting the antennas includes determining in the second communication node a preferred orientation for the first antenna, and reporting the preferred orientation to the first communication node over the secondary communication network.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for tropospheric scatter communication. The embodiments described herein refer mainly to High-Frequency Trading (HFT) applications in which latency in a prime design goal. The disclosed techniques, however, can be used in various other applications.

In some embodiments, a communication system comprises multiple communication nodes that communicate over a tropospheric scattering channel. The nodes are cascaded to form a point-to-point, multi-hop tropospheric scatter link that connects two endpoints. In addition, the nodes are connected to a secondary, wireless or wireline, communication network. A central controller configures the nodes and the system in general using the secondary communication network.

In some embodiments, the controller reconfigures the nodes adaptively to provide minimal latency over the tropospheric scatter link, whereas the secondary network is less sensitive to latency. This embodiment is useful, for example, HFT applications in which it is crucial to communicate between trading centers with minimal latency.

In some embodiments, the controller reconfigures the system by removing one or more nodes from the cascaded link, and/or adding one or more nodes to the cascaded link. For example, the controller may remove and/or add nodes in order to achieve the smallest latency under certain performance (e.g., throughput) constraints. The capability to change the number of nodes in the cascaded link enables the controller to switch between various latency/throughput trade-offs.

In some applications the controller may reduce the number of nodes in the cascade during specific times of the day. This configuration reduces latency but typically comes at the expense of lower throughput. At other times that are less sensitive to latency, e.g., at night or on weekends, the controller may increase the number of nodes in the cascade and thus achieve higher throughput.

Additionally or alternatively, the central controller may use the communication over the secondary network to allocate operating frequencies to the various hops in an adaptive manner. In some embodiments, the reconfiguration process involves adapting the antenna alignment in the nodes. An example antenna alignment process, which achieves accurate alignment by exploiting the capability of the nodes to communicate over the secondary network, is described herein.

System Description

Figure 1:
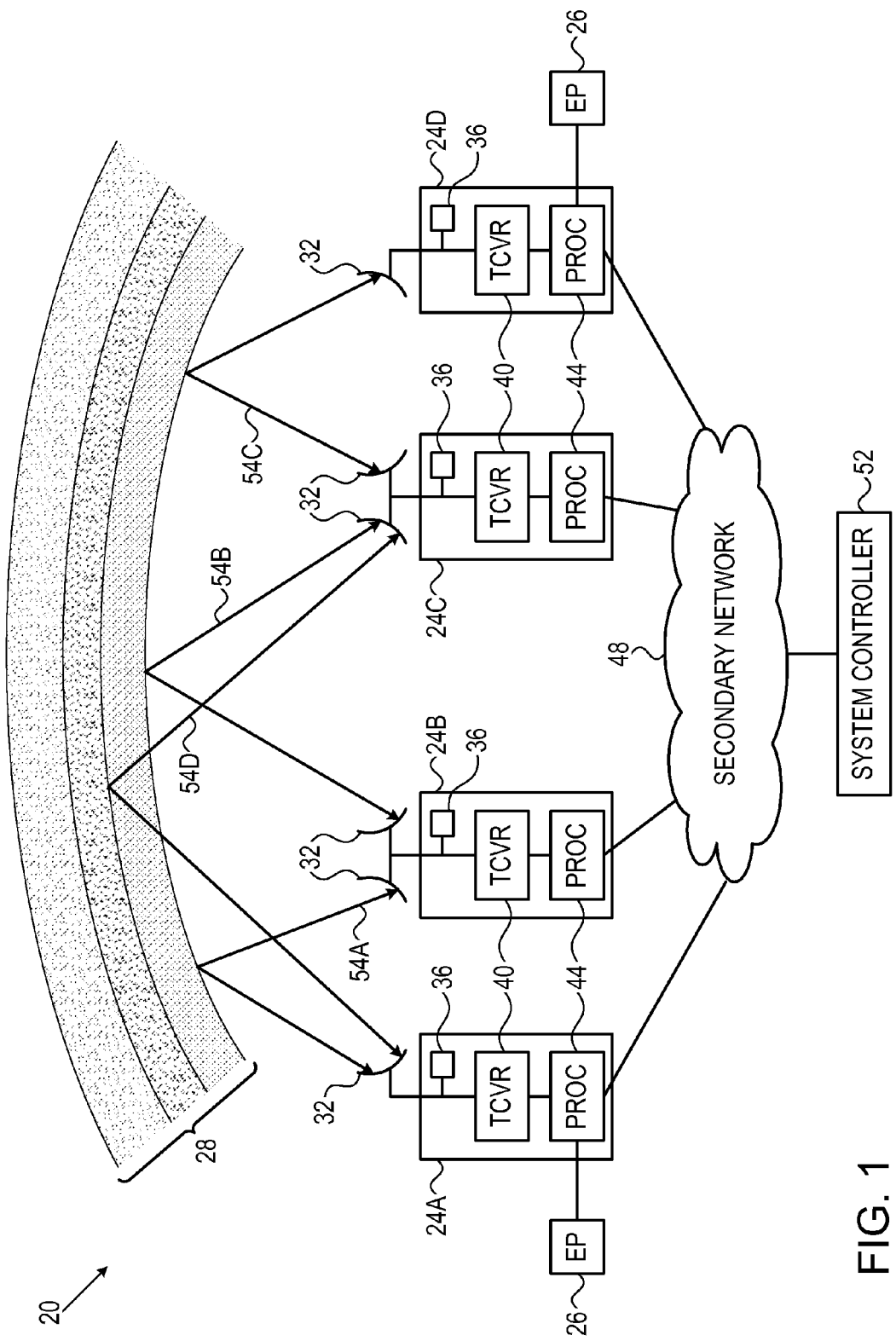
FIG. 1 is a block diagram that schematically illustrates a multi-hop tropospheric scatter communication system, in accordance with an embodiment of the present invention.

FIG. 1 is a block diagram that schematically illustrates a multi-hop tropospheric scatter communication system 20, in accordance with an embodiment of the present invention. In the present example, system 20 is used in a High-Frequency Trading (HFT) application. Alternatively, however, a system of this sort can be used in any other suitable application.

System 20 comprises multiple communication nodes 24A . . . 24D that communicate using tropospheric scattering. Nodes 24A . . . 24D are connected in cascade, so as to form a multi-hop communication link that connects two endpoints (EP) 26. Nodes 24A and 24D are referred to as edge nodes, and nodes 24B and 24C are referred to as relay nodes. The present example shows a cascade of four communication nodes. Alternatively, however, the system may comprise any other suitable number of nodes. The nodes may communicate on any Radio Frequency (RF) band that is suitable for tropospheric scatter communication, e.g., between 200 MHz-20 GHz.

Each communication node comprises one or more antennas 32, an antenna control unit 36, a transceiver (TCVR) 40 and a processor 44. In each node, antennas 32 transmit and receive signals over the tropospheric scattering channel. Antenna control unit 36 controls antennas 32, and in particular adjusts the antenna elevation to the appropriate setting. Transceiver 40 carries out the various transmission and reception functions of the node. Processor 44 manages the node operation.

The relaying nodes (nodes 24B and 24C in the example of FIG. 1) may be implemented using various relaying schemes. In one embodiment, transceiver 40 of the node performs RF-to-RF relaying with frequency translation, i.e., converts the received signal to a different frequency and retransmits the signal. In some embodiments, the transceiver down-converts the received signal to baseband, performs some analog signal shaping or other filtering, and then up-converts the signal to the desired transmission frequency. In these embodiments, the nodes do not sample the signal or perform digital signal processing, to avoid incurring large processing delays. Nevertheless, in alternative embodiments the transceiver may digitize the received signal, perform some digital signal processing and convert the processed signal to digital form for transmission.

In addition to the communication over the tropospheric channel, processors 44 of nodes 24A . . . 24D communicate with a central system controller 52, and possibly with one another, over a secondary network 48. Secondary network 48 may comprise any suitable wireless or wireline communication system, such as a cellular network, an amateur radio network, a microwave-link network, the Internet, an optical fiber network, or any other suitable communication network. Controller 52 typically comprises a standalone computer. Alternatively, one of processors 44 may be assigned to carry out the functions of the central controller. Further alternatively, system 20 may use a hybrid control architecture in which controller 52 issues high-level commands and one of processors 44 is responsible for executing the high-level commands vis-à-vis processors 44 of the other nodes. Generally, the control tasks of system 20 may be partitioned among controller 52 and processors 44 in any suitable manner.

The configurations of system 20 and of the communication nodes shown in FIG. 1 are depicted purely for the sake of conceptual clarity. In alternative embodiments, any other suitable system and/or node configuration can be used. The various elements of system may be implemented using software, hardware, or a combination of hardware and software elements. In some embodiments, processors 44 and/or controller 52 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Automatic Reconfiguration of Troposcatter Link Using Secondary Network

In some embodiments, system controller 52 configures nodes 24A . . . 24D by communicating with the nodes over secondary network 48. For example, in some embodiments controller 52 identifies a subset of the nodes that is sufficient for establishing communication between endpoints 26. Controller 52 configures this subset, by adding one or more nodes to the cascade and/or removing one or more nodes from the cascade.

Consider the example of FIG. 1. One possible configuration that may be chosen by controller 52 includes all four nodes, in which case communication is carried out over hops 54A, 54B and 54C. Another possible configuration that can be chosen includes only nodes 24A, 24C and 24D (but not node 24B), in which case communication is carried out over hops 54D (directly connecting nodes 24A and 24C) and 54C. The former configuration is denoted configuration A, and the latter configuration is denoted configuration B. These two configurations are shown purely by way of example. In alternative embodiments, controller 52 may choose any other suitable subset of the nodes.

Controller typically 52 switches from configuration A to configuration B by removing node 24B from the cascade and instructing nodes 24A and 24C to communicate directly with one another. Switching from configuration B to configuration A is typically performed by adding node 24B to the cascade, instructing node 24A to communicate with node 24B, instructing node 24B to communicate with nodes 24A and 24C, and instructing node 24C to communicate with node 24B.

Switching from one configuration to another typically changes the geometry of at least some of the tropospheric propagation paths. Therefore, when switching between configurations, controller 52 typically instructs the nodes affected by the change to realign their antennas. An example antenna alignment process that can be used for this purpose is described in FIG. 3 further below.

The choice of subset typically depends on factors such as channel conditions on the various hops (e.g., propagation conditions and interference), latency requirements and throughput requirements. Controller 52 may choose the appropriate subset so as to apply various performance goals or trade-offs.

For example, in some applications (e.g., HFT) the end-to-end latency between endpoints 26 is of prime importance. Since each node in the cascade adds some processing latency, the end-to-end latency depends on the number of nodes in the cascade. In such applications, controller 52 may identify and choose the smallest subset of nodes that enables communication between endpoints 26. As a result, the end-to-end latency between endpoints 26 is kept at a minimum.

Typically, controller 52 searches for the minimal subset of nodes that still meets some performance threshold, e.g., a certain minimal required throughput. Thus, various trade-offs between throughput and latency can be applied. The trade-off affecting the choice of node subset may vary over time. In an example embodiment, controller 52 may enforce very small latency at certain times (at the expense of throughput), and tolerate slightly higher latency at other times (allowing for higher throughput). Different trade-offs may be applied, for example, at different times of the day, on different days of the week or month, or in accordance with any other suitable criterion.

In one example system implementation, the overall distance between the endpoints is 1200 Km, the operating frequencies of the nodes are set in the 3.5 GHz band, the maximum allowed Effective Isotropic Radiated Power (EIRP) is +55 dBW, the node antenna gain is 45 dBi, and the signal is modulated using Binary Phase Shift Keying (BPSK). The required availability in this example is either 50% or 90% for the worst month of the year. The tropospheric scattering channel is modeled in accordance with Recommendation ITU-R P.617-2 of the International Telecommunication Union (ITU), entitled "Propagation prediction techniques and data required for the design of trans-horizon radio-relay systems," February, 2012, which is incorporated herein by reference. The example uses climate model 5, specified in ITU-R P.617-2, which is applicable, for example, to Europe and the US east coast.

Under these parameters, a multi-hop tropospheric scattering link may be set-up using either two, three, four, six or twelve hops, depending on channel latency and throughput requirements. Controller 52 is able to alternate between these configurations as needed, so as to set various throughput-latency trade-offs. The simulated performance of these five configurations is given in Table 1 below. In this example, the latency of a repeater node is assumed to be 10 μS.

TABLE 1

Example throughput-latency trade-offs using a configurable number of troposcatter hops

| # hops | # repeater nodes | End-to-end latency [μS] | Hop length [Km] | Throughput [Kbps] @50% availability | Throughput [Kbps] @90% availability |
|---|---|---|---|---|---|
| 2 | 1 | 4010 | 600 | 8 | 2.5 |
| 3 | 2 | 4020 | 400 | 140 | 30 |
| 4 | 3 | 4030 | 300 | 620 | 110 |
| 6 | 5 | 4050 | 200 | 3500 | 520 |
| 12 | 11 | 4110 | 100 | 32000 | 4400 |

For comparison, the propagation delay in a 1200 Km fibre-cable is ~6000 μS, the propagation delay of radio waves over a 1200 Km link is ~4000 μS. An extremely low-latency line-of-sight microwave link can cover the 1200 Km distance with approximately fifty repeaters each having an excess delay of 5 μS, reaching 250 μS extra latency to yield an end-to-end latency of 4250 μS.

In alternative embodiments, any other suitable troposcatter channel model can be used. Another example model is the Boithias and Battesti model, which is described, for example, in "Microwave Engineering: Land & Space Radiocommunications," Gérard Barué, Wiley, 2008, page 378, which is incorporated herein by reference.

In some embodiments, controller 52 adaptively allocates the operating frequencies used by transceivers on the various tropospheric scattering hops. In an example embodiment, each transceiver performs channel measurements, signal strength measurements and/or interference measurements across the available spectrum. The nodes report these measurements to controller 52 over secondary network 48. Controller 52 allocates frequency channels to the various hops based on the reported measurements, and notifies the transceivers of the allocated reception and transmission frequencies over the secondary network. For example, the controller may inform each node of the frequencies having smallest interference levels. Alternatively, controller 52 may allocate operating frequencies based on any other suitable criterion.

Controller 52 carries out the various control functions (e.g., adding a node to the cascade, removing a node from the cascade, instructing nodes to perform antenna alignment, setting an operating frequency for a hop and/or obtaining channel measurement information) by communicating with processors 44 of nodes 24A . . . 24D over secondary network 48.

Figure 2:
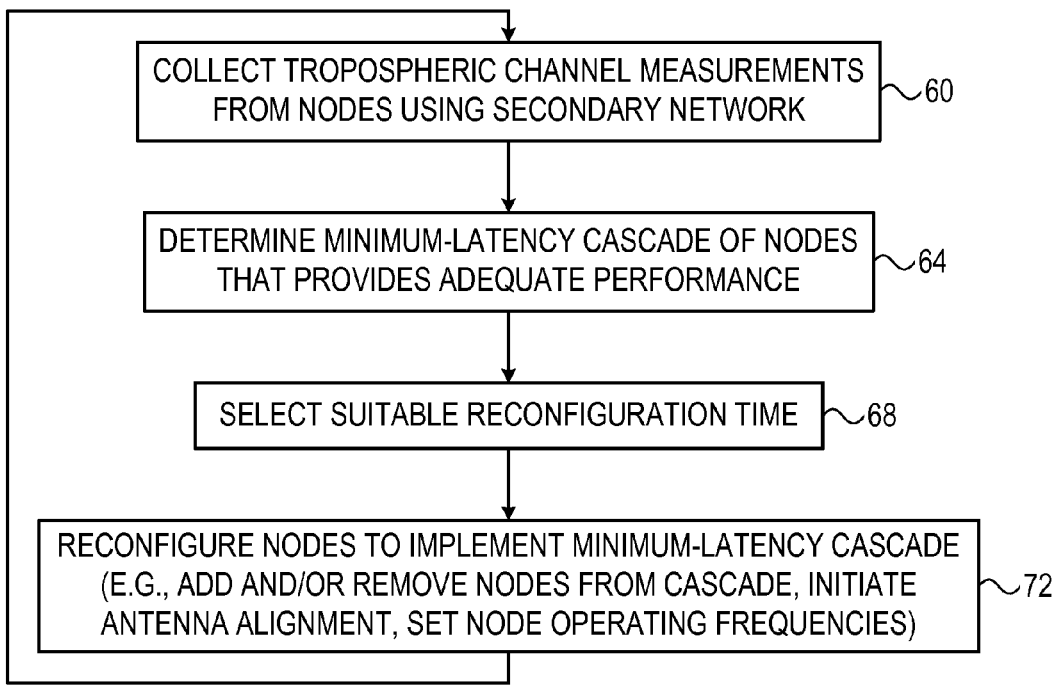
FIG. 2 is a flow chart that schematically illustrates a method for automatic reconfiguration of a multi-hop tropospheric scatter communication system, in accordance with an embodiment of the present invention.

FIG. 2 is a flow chart that schematically illustrates a method for automatic reconfiguration of system 20, in accordance with an embodiment of the present invention. The method begins with controller 52 collecting measurement reports from nodes 24A . . . 24D using secondary network 48, at a measurement reporting step 60. The measurements may comprise, for example, channel measurements, interference measurements, noise measurement or any other suitable measurement type.

Controller 52 identifies a suitable subset of nodes 24A . . . 24D for cascading and connecting endpoints 26, at a subset selection step 64. In an example embodiment, controller 52 selects the smallest (and thus minimum-latency) subset of the nodes that, when cascaded, provides adequate end-to-end communication performance (e.g., throughput). In some embodiments, although not necessarily, the subset selection may depend, at least in part, on the measurements obtained at step 60.

In some embodiments, assuming the subset identified at step 64 is different from the set of nodes that currently form the cascade, controller 52 selects an appropriate time for reconfiguring the system, at a time selection step 68. In these embodiments, reconfiguration causes certain down-time, i.e., a period of time during which the link is inoperative. Depending on the application, down-time may be permitted at certain times and forbidden at other times. Controller 52 typically picks a permitted time for reconfiguration.

At the selected time, controller 52 reconfigured nodes 24A . . . 24D by communicating with the nodes over secondary network 48, at a reconfiguration step 72. As explained above, reconfiguration may involve, for example, adding one or more nodes to the cascade, removing one or more nodes from the cascade, instructing one or more nodes to perform antenna alignment, and/or setting an operating frequency for one or more nodes.

At this stage, system 20 begins to operate in accordance with the updated configuration. The method then loops back to step 60 above.

The method of FIG. 2 is depicted purely by way of example. In alternative embodiments, any other suitable reconfiguration method can be used.

Antenna Alignment Method

In some embodiments, two nodes that are connected by a tropospheric scattering hop carry out a process of aligning their antennas to the orientation (typically elevation) that provides the best achievable link budget. The disclosed antenna alignment process uses the fact that the nodes are able to communicate with one another over secondary network 48. In an embodiment, although not necessarily, this process may be used as part of the node reconfiguration scheme described above.

Figure 3:
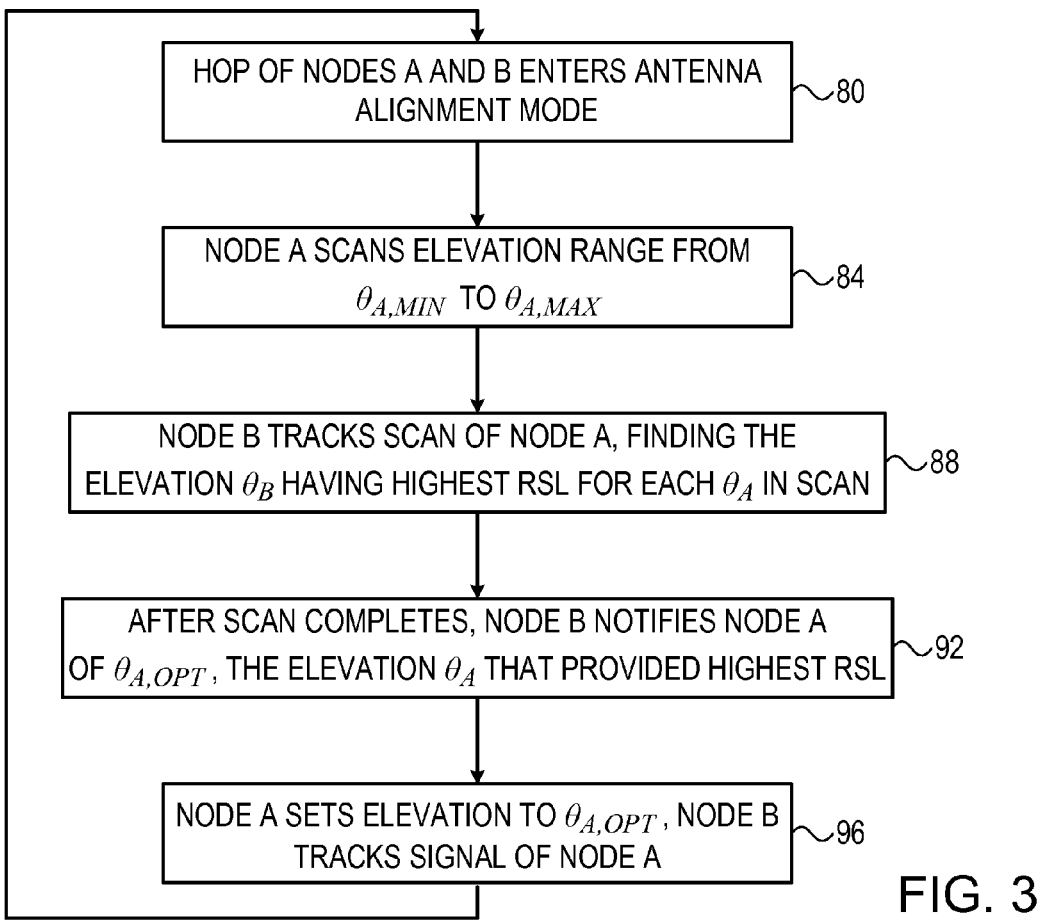
FIG. 3 is a flow chart that schematically illustrates a method for antenna alignment in a tropospheric scatter communication link, in accordance with an embodiment of the present invention.

FIG. 3 is a flow chart that schematically illustrates a method for antenna alignment, in accordance with an embodiment of the present invention. The method is carried out jointly by two nodes denoted A and B, whose processors 44 communicate with one another over secondary network 48.

The method begins when the nodes are instructed by controller 52 to enter an antenna alignment mode, at an initiation step 80. Node A scans its antenna 32 through the possible range of elevation angles, at a scanning step 84. The minimal and maximal elevation angles of node A are denoted $\theta_{A,MIN}$ and $\theta_{A,MAX}$, respectively.

Concurrently with the scan of step 84, node B tracks the signal transmitted by node A, at a tracking step 88. For each elevation angle $\theta_A$ of node A, node B finds the corresponding elevation angle of its own antenna, denoted $\theta_B$, which yields the best communication performance (e.g., highest Received Signal Level (RSL) or highest signal to noise ratio (SNR) or lowest bit error ratio (BER)).

After the scan is completed, node B notifies node A of the optimal elevation angle for node A, denoted $\theta_{A,OPT}$, at an angle reporting step 92. The optimal elevation angle $\theta_{A,OPT}$ is the angle $\theta_A$ that provided the overall highest RSL. at steps 84 and 88.

Nodes A and B then configure the optimal alignment, at an aligning step 96. Typically, node A sets its elevation angle to $\theta_{A,OPT}$ that was reported by node B. Node B begins to track the signal transmitted by node A, typically starting from the angle $\theta_B$ that corresponded to $\theta_{A,OPT}$ at step 88.

The method of FIG. 3 uses the capability of nodes A and B to communicate over the secondary network. The inter-node communication is used, for example, for coordinating the scan of steps 84 and 88, and for reporting $\theta_{A,OPT}$ at step 92. One of the advantages of this method is that it converges to the globally-optimal $\theta_{A,OPT}$, rather than tracking a local maximum that may not be globally optimal. (Multiple local maxima are not uncommon in troposcatter channels, since signals may be scattered from multiple different atmospheric layers.) Moreover, the method of FIG. 3 is able to transition from one local maximum to another, if the latter provides better performance (e.g., higher RSL, highest SNR or lowest BER).

The method of FIG. 3 is shown purely by way of example. In alternative embodiments, the nodes may use any other suitable antenna alignment process that exploits their capability to communicate over the secondary network. For example, although the description above refers to adjustment of antenna elevation, the disclosed techniques can be used for adjusting any orientation of the antenna, e.g., azimuth. In an example embodiment, the nodes may perform azimuth scanning within a limited angular range, to accommodate for less-than-perfect antenna alignment in azimuth.

Although the embodiments described herein mainly address the use of a secondary network dedicated for control and configuration, the methods and systems described herein can also be used in other applications in which alternative means for communication exist between troposcatter nodes. Such applications may comprise, for example, systems in which the troposcatter link serves as backup to some other communication network, or in systems in which the troposcatter link is used as a secure link in parallel with some other non-secure link.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A communication system, comprising:
multiple communication nodes, which are configured to relay data between first and second endpoints by communicating in a cascade over a tropospheric scattering channel; and
a processor, which is configured to control communication of the communication nodes over the tropospheric scattering channel, including adaptively adding or removing at least one of the communication nodes to and from the cascade, by communicating with the communication nodes over a secondary communication network, different from the tropospheric scattering channel, to identify a minimal subset of the communication nodes that are needed for connecting the first and second endpoints, and to configure the cascade such that the cascade includes only the minimal subset of the communication nodes.

2. The communication system according to claim 1, wherein the processor is configured to adaptively set respective operating frequencies of the communication nodes on the tropospheric scatter channel.

3. The communication system according to claim 1, wherein the processor is configured to obtain from the communication nodes, by communication over the secondary communication network, measurements relating to the tropospheric scattering channel, and to control the communication over the tropospheric scattering channel based on the measurements.

4. The communication system according to claim 1, wherein the processor is configured to instruct a pair of the communication nodes, over the secondary communication network, to perform an antenna alignment process.

5. The communication system according to claim 1, wherein a pair of the communication nodes is configured to perform a mutually-coordinated antenna alignment process by communicating over the secondary communication network.

6. The communication system according to claim 1, wherein the processor is configured to select a time that is permitted for reconfiguring the communication nodes, and to coordinate reconfiguration of the communication nodes at communication the selected time using the secondary network.

7. A communication system, comprising:
multiple communication nodes, which are configured to relay data between first and second endpoints by communicating in a cascade over a tropospheric scattering channel; and
a processor, which is configured to control communication of the communication nodes over the tropospheric scattering channel by communicating with the communication nodes over a secondary communication network, different from the tropospheric scattering channel, including adaptively adding or removing at least one of the communication nodes to and from the cascade, and alternating between:
a first configuration in which the data is relayed with a first end-to-end latency and a first end-to-end throughput; and
a second configuration in which the data is relayed with a second end-to-end latency, smaller than the first end-to-end latency, and a second end-to-end throughput that is smaller than the first end-to-end throughput.

8. A method for communication, comprising:
relaying data between first and second endpoints by communicating among multiple communication nodes in a cascade over a tropospheric scattering channel; and
controlling communication of the communication nodes over the tropospheric scattering channel, including adaptively adding or removing at least one of the communication nodes to and from the cascade, by communicating with the communication nodes over a secondary communication network, different from the tropospheric scattering channel, identifying a minimal subset of the communication nodes that are needed for connecting the first and second endpoints, and configuring the cascade such that the cascade includes only the minimal subset of the communication nodes.

9. The method according to claim 8, wherein communicating with the communication nodes comprises adaptively setting respective operating frequencies of the communication nodes on the tropospheric scatter channel.

10. The method according to claim 8, wherein communicating with the communication nodes comprises obtaining from the communication nodes, by communication over the secondary communication network, measurements relating to the tropospheric scattering channel, and controlling the communication over the tropospheric scattering channel based on the measurements.

11. The method according to claim 8, wherein communicating with the communication nodes comprises instructing a pair of the communication nodes, over the secondary communication network, to perform an antenna alignment process.

12. The method according to claim 8, wherein communicating among the communication nodes comprises performing a mutually-coordinated antenna alignment process by a pair of the communication nodes, by communicating over the secondary communication network.

13. The method according to claim 8, wherein communicating with the communication nodes comprises selecting a time that is permitted for reconfiguring the communication nodes, and coordinating reconfiguration of the communication nodes at the selected time using the secondary communication network.

14. A method for communication, comprising:
relaying data between first and second endpoints by communicating among multiple communication nodes in a cascade over a tropospheric scattering channel; and
controlling communication of the communication nodes over the tropospheric scattering channel, including adaptively adding or removing at least one of the communication nodes to and from the cascade, by communicating with the communication nodes over a secondary communication network, different from the tropospheric scattering channel, wherein adding or removing the communication nodes comprises alternating between:
a first configuration in which the data is relayed with a first end-to-end latency and a first end-to-end throughput; and
a second configuration in which the data is relayed with a second end-to-end latency, smaller than the first end-to-end latency, and a second end-to-end throughput that is smaller than the first end-to-end throughput.

* * * * *